(12) United States Patent
Kasinec

(10) Patent No.: US 12,729,806 B2
(45) Date of Patent: Sep. 8, 2026

(54) BRACKET ADAPTER APPARATUS

(71) Applicant: Michael Kasinec, Chesterfield, MI (US)

(72) Inventor: Michael Kasinec, Chesterfield, MI (US)

( * ) Notice: Subject to any disclaimer, the term of this patent is extended or adjusted under 35 U.S.C. 154(b) by 94 days.

(21) Appl. No.: 18/797,138

(22) Filed: Aug. 7, 2024

(65) Prior Publication Data

US 2026/0043514 A1 Feb. 12, 2026

(51) Int. Cl.
*F16M 13/02* (2006.01)
*A47B 57/40* (2006.01)

(52) U.S. Cl.
CPC ............. *F16M 13/02* (2013.01); *A47B 57/40* (2013.01)

(58) Field of Classification Search
CPC ...... F16M 13/02; A47B 57/402; A47B 57/34; A47B 57/40; A47B 57/42
USPC .. 248/489, 205.1, 215, 220.21, 223.41, 235, 248/250; 211/105.1
See application file for complete search history.

(56) References Cited

U.S. PATENT DOCUMENTS 1,937,571 A 12/1933 Hueneburg
3,049,327 A 8/1962 Caudell
3,430,908 A 3/1969 Kowalczyk
3,704,851 A 12/1972 Cormier
4,140,294 A 2/1979 Zwarts
4,322,050 A 3/1982 Roach
5,230,492 A * 7/1993 Zwart .................... A47B 57/42 248/220.42
5,535,972 A * 7/1996 Fallago ................ A47B 96/061 248/245
5,575,444 A * 11/1996 Otema ................ A47B 57/045 248/242
5,975,318 A * 11/1999 Jay .......................... A47F 5/101 248/242
D622,578 S 8/2010 Kollman
8,770,529 B2 * 7/2014 Berglund ............ A47B 57/045 248/242
10,470,590 B2 * 11/2019 Wills ...................... A47F 5/103
12,121,146 B2 * 10/2024 Bishop .................. A47B 57/42
12,329,280 B2 * 6/2025 Li ........................ A47B 96/028

FOREIGN PATENT DOCUMENTS

CA 2124257 11/1998

* cited by examiner

*Primary Examiner* — Todd M Epps

(57) ABSTRACT

A bracket adapter apparatus for adjusting the placement of a load on a mounting bracket includes a main body which defines a slot in a back side thereof. The slot is sized and configured to receive a projection of the mounting bracket therein. An offset projection is coupled to the main body and extends forwardly with respect to the main body. The offset projection includes a rear section and a front section, wherein the front section extends upwardly beyond an upper side of the rear section. The upper side of the rear section of the offset projection is offset in a vertical direction from an upper inner surface of the slot. A load such as a curtain rod may then be hung off of the offset projection rather than the projection of the mounting bracket.

10 Claims, 6 Drawing Sheets

BRACKET ADAPTER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bracket adapters and more particularly pertains to a new bracket adapter for adjusting the placement of a load on a mounting bracket.

(2) Description of Related Art Including Information Disclosed Under 37 CFR 1.97 and 1.98

The prior art discloses various mounting brackets which are adjustable in various ways to adjust placement of a load on the mounting bracket. However, the prior art fails to describe a bracket adapter which may be mounted on a mounting bracket and provide another structure similar to the mounting bracket on which to hang the load. Such a device could be used, for example, for adjusting placement of a curtain rod without removing and reinstalling mounting brackets for the curtain rod.

BRIEF SUMMARY OF THE INVENTION

An embodiment of the disclosure meets the needs presented above by generally comprising a main body which defines a slot in a back side thereof. The slot is sized and configured to receive a projection of a mounting bracket therein. An offset projection is coupled to the main body and extends forwardly with respect to the main body. The offset projection includes a rear section and a front section, wherein the front section extends upwardly beyond an upper side of the rear section. The upper side of the rear section of the offset projection is offset in a vertical direction from an upper inner surface of the slot, wherein the vertical direction is defined as extending between a top side and a bottom side of the main body. A load such as a curtain rod may then be hung off of the offset projection rather than the projection of the mounting bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
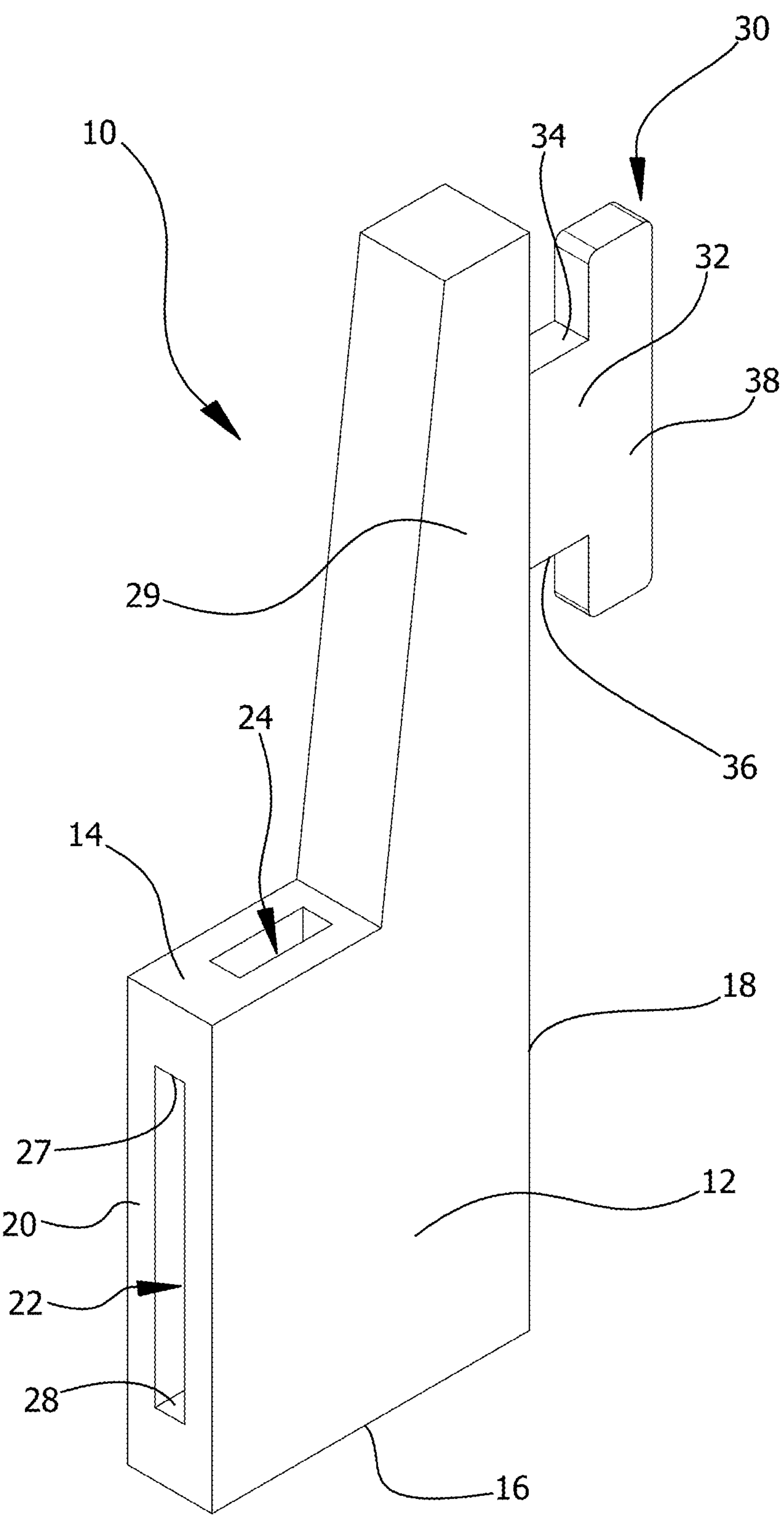
FIG. 1 is a top back perspective view of a bracket adapter apparatus according to an embodiment of the disclosure.
Figure 2:
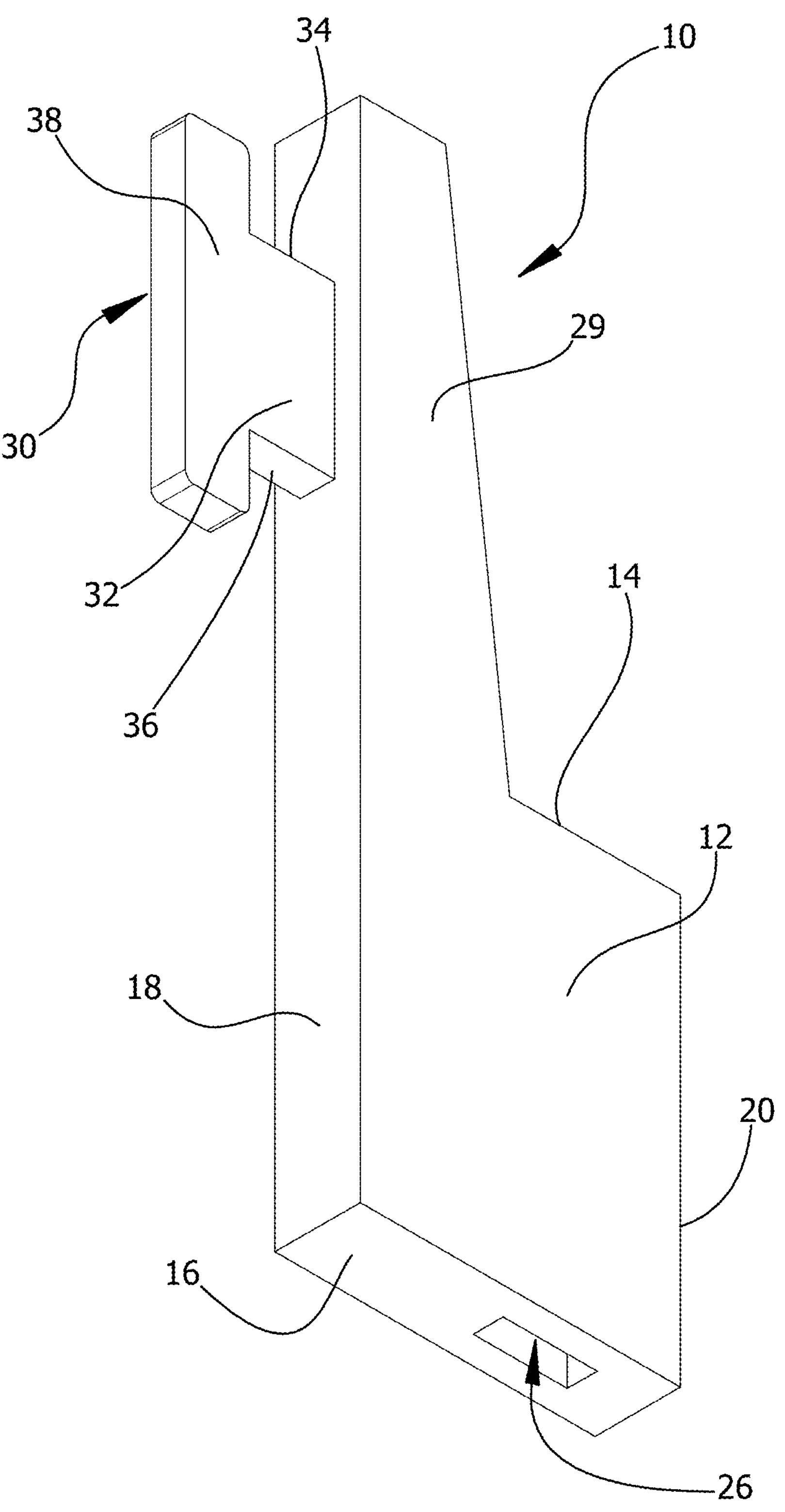
FIG. 2 is a bottom front perspective view of an embodiment of the disclosure.
Figure 3:
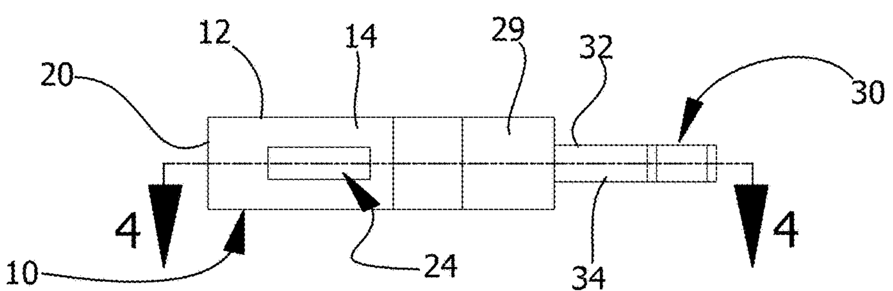
FIG. 3 is a top view of an embodiment of the disclosure.
Figure 4:
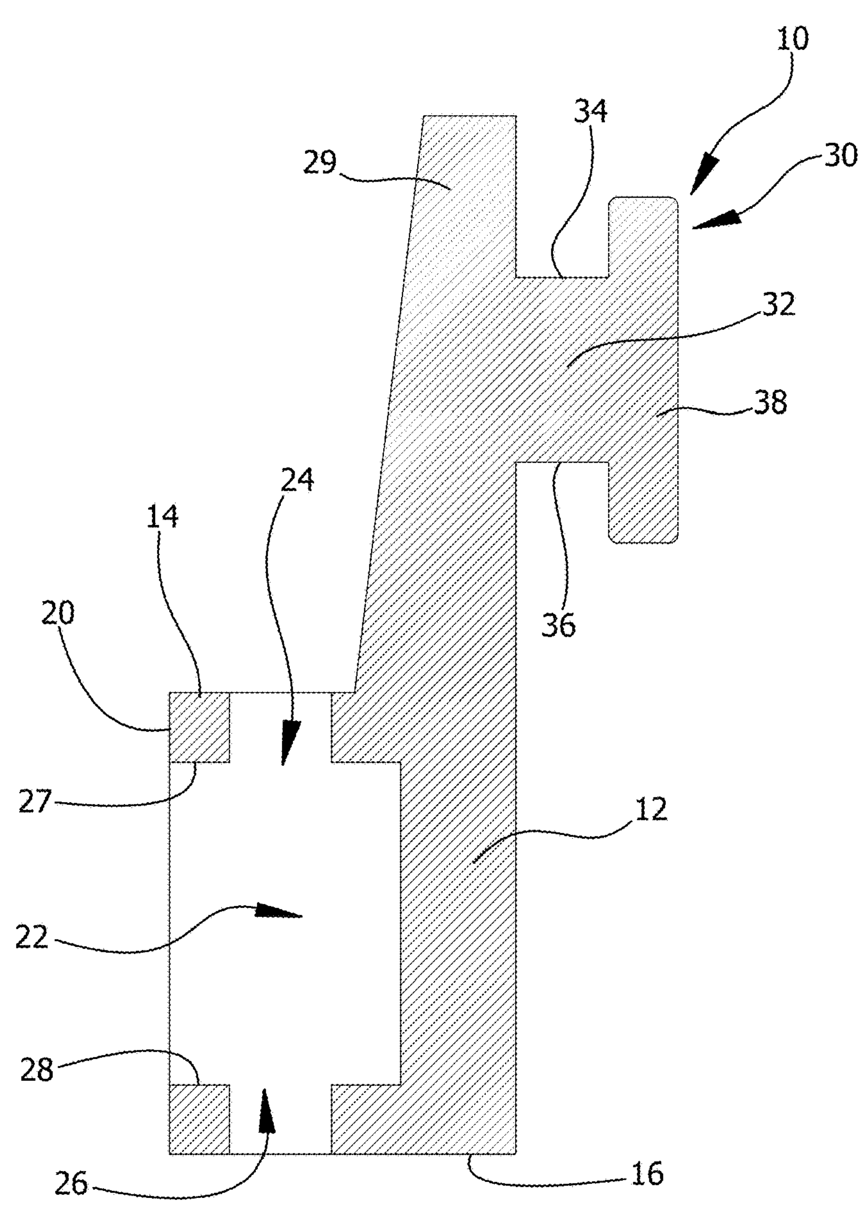
FIG. 4 is a cross section view of an embodiment of the disclosure taken from Line 4-4 in FIG. 3.

With reference now to the drawings, and in particular to FIGS. 1 through 7 thereof, a new bracket adapter embodying the principles and concepts of an embodiment of the disclosure and generally designated by the reference numeral 10 will be described.

As best illustrated in FIGS. 1 through 7, the bracket adapter apparatus 10 generally comprises a main body 12 which defines a slot 22 in a back side 20 thereof. The slot 22 is sized and configured to receive a projection 42 of a mounting bracket 40 therein. The main body 12 also defines an upper channel 24 which is in fluid communication with the slot 22 and extends toward a top side 14 of the main body 12. The main body 12 further defines a lower channel 26 which is in fluid communication with the slot 22 and extends toward a bottom side 16 of the main body 12. The upper channel 24 and the lower channel 26 are open at the top side 14 of the main body 12 and the bottom side 16 of the main body 12 respectively.

An extension member 29 is coupled to the main body 12. The extension member 29 is positioned on the top side 14 of the main body 12 between the upper channel 24 and a front side 18 of the main body 12. The extension member 29 extends upwardly from the main body 12 with respect to the main body 12. An offset projection 30 is coupled to a front surface of the extension member 29. The offset projection 30 has a sideways T-shape and may be similar in size and shape to the projection 42 of the mounting bracket 40. The offset projection 30 includes a rear section 32 and a front section 38, wherein the front section 38 extends upwardly beyond an upper side 34 of the rear section 32 and extends downwardly beyond a lower side 36 of the rear section 32.

The offset projection 30, the extension member 29, and the main body 12 are integrally formed with each other, but they may be distinct parts joined together in some embodiments. The offset projection 30 also may be directly coupled to the main body 12 in some embodiments.

The upper side 34 of the rear section 32 of the offset projection 30 is offset upwardly from the uppermost side 46 of the rear portion 44 of the projection 42. The lower side 36 of the rear section 32 of the offset projection 30 is offset upwardly from the lowermost side 48 of the rear portion 44 of the projection 42. Due to this arrangement, the bracket adapter apparatus 10 may be hung upright on the projection 42 of the mounting bracket 40 to offset a load which is to be mounted to the mounting bracket 40 upwardly from the projection 42 of the mounting bracket 40. By hanging the bracket adapter apparatus 10 in an inverted configuration on the mounting bracket 40, the load may be offset downwardly from the projection 42 of the mounting bracket 40. When the bracket adapter apparatus 10 is hung upright, the load may be hung on the upper side 34 of the rear section 32 of the offset projection 30. When the bracket adapter apparatus 10 is hung inverted, the load may be hung on the lower side 36 of the rear section 32 of the offset projection 30. The load may be a curtain rod or any other suitable element for hanging on the bracket adapter apparatus 10.

The Figures depict the mounting bracket 40 having a sideways T-shape, in which a front portion 50 of the projection 42 extends upwardly past an uppermost side 46 of the rear portion 44 and extends downwardly beyond a lowermost side 48 of the rear portion 44. A height of the slot 22 as measured between an upper inner surface 27 of the slot 22 and a lower inner surface 28 of the slot 22 is less than a height of the front portion 50 of the projection 42 as measured between an upper end 52 of the front portion 50 and a lower end 54 of the front portion 50. The height of the slot 22 is, however, greater than a height of the rear portion 44 as measured between the uppermost side 46 and the lowermost side 48 of the rear portion 44. Thus, to hang the main body 12 of the bracket adapter onto the projection 42 of the mounting bracket 40, the main body 12 must be angled to receive the projection 42 into the slot 22.

Figure 5:
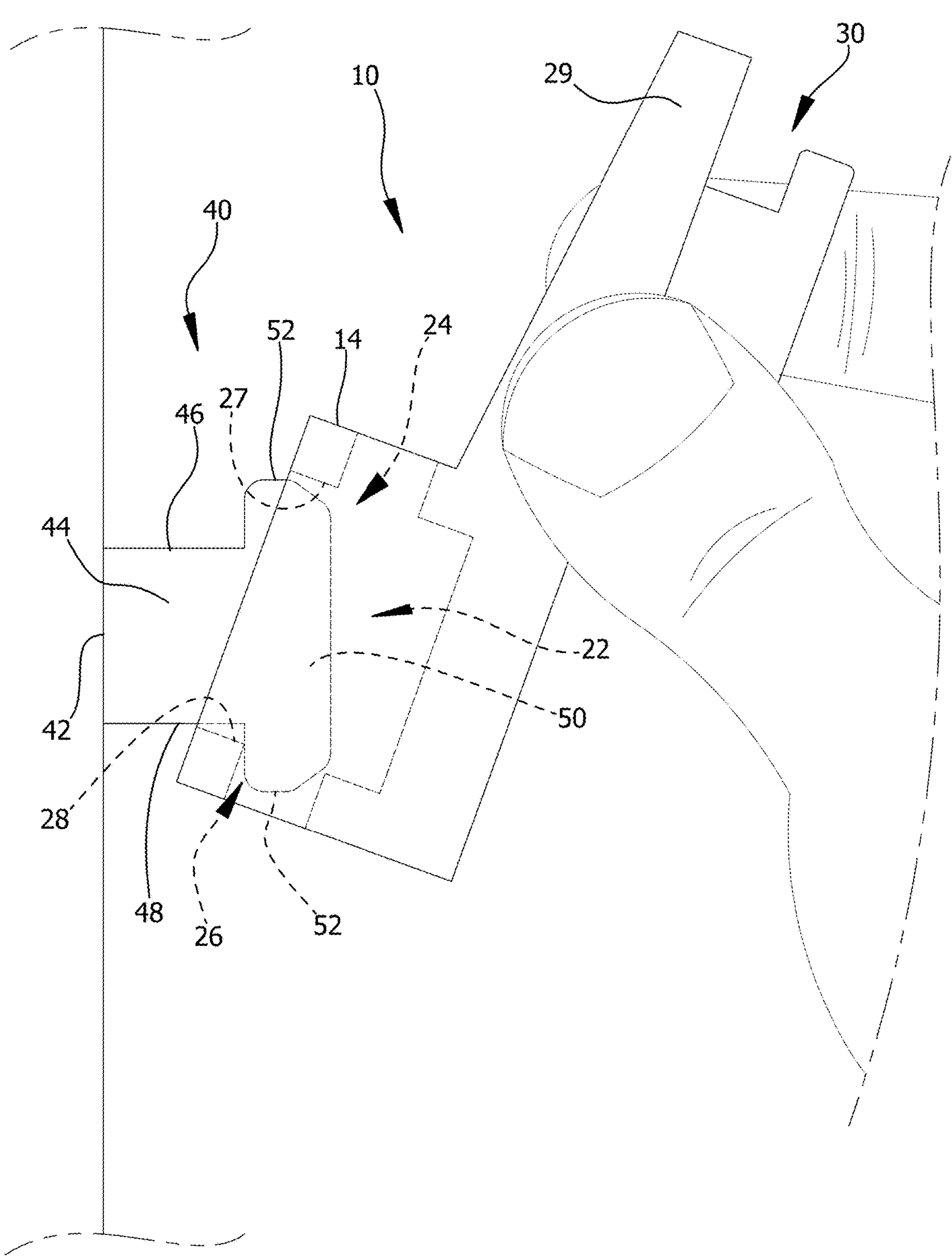
FIG. 5 is an in-use view of an embodiment of the disclosure.
Figure 6:
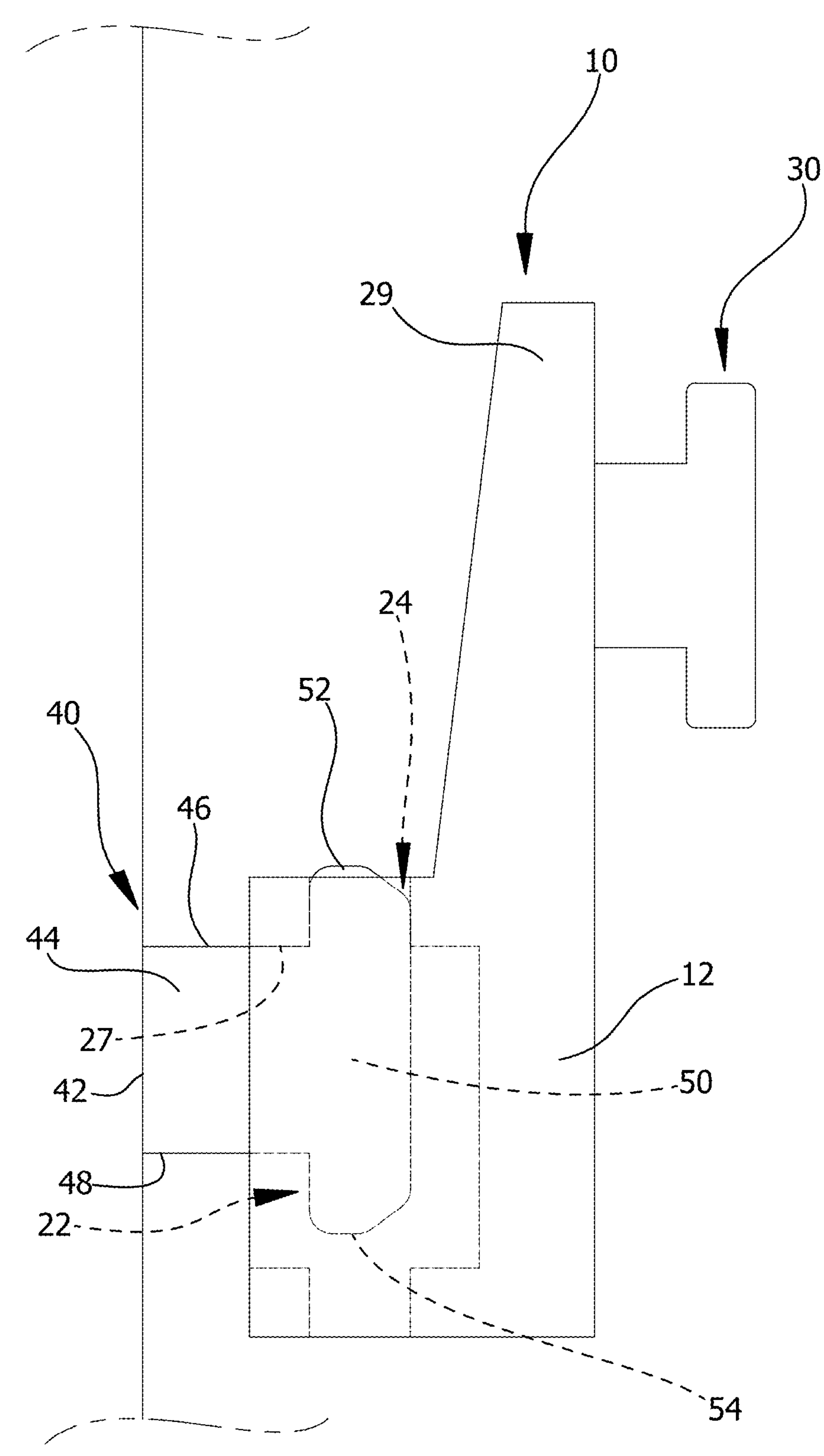
FIG. 6 is an in-use view of an embodiment of the disclosure in an upright configuration.
Figure 7:
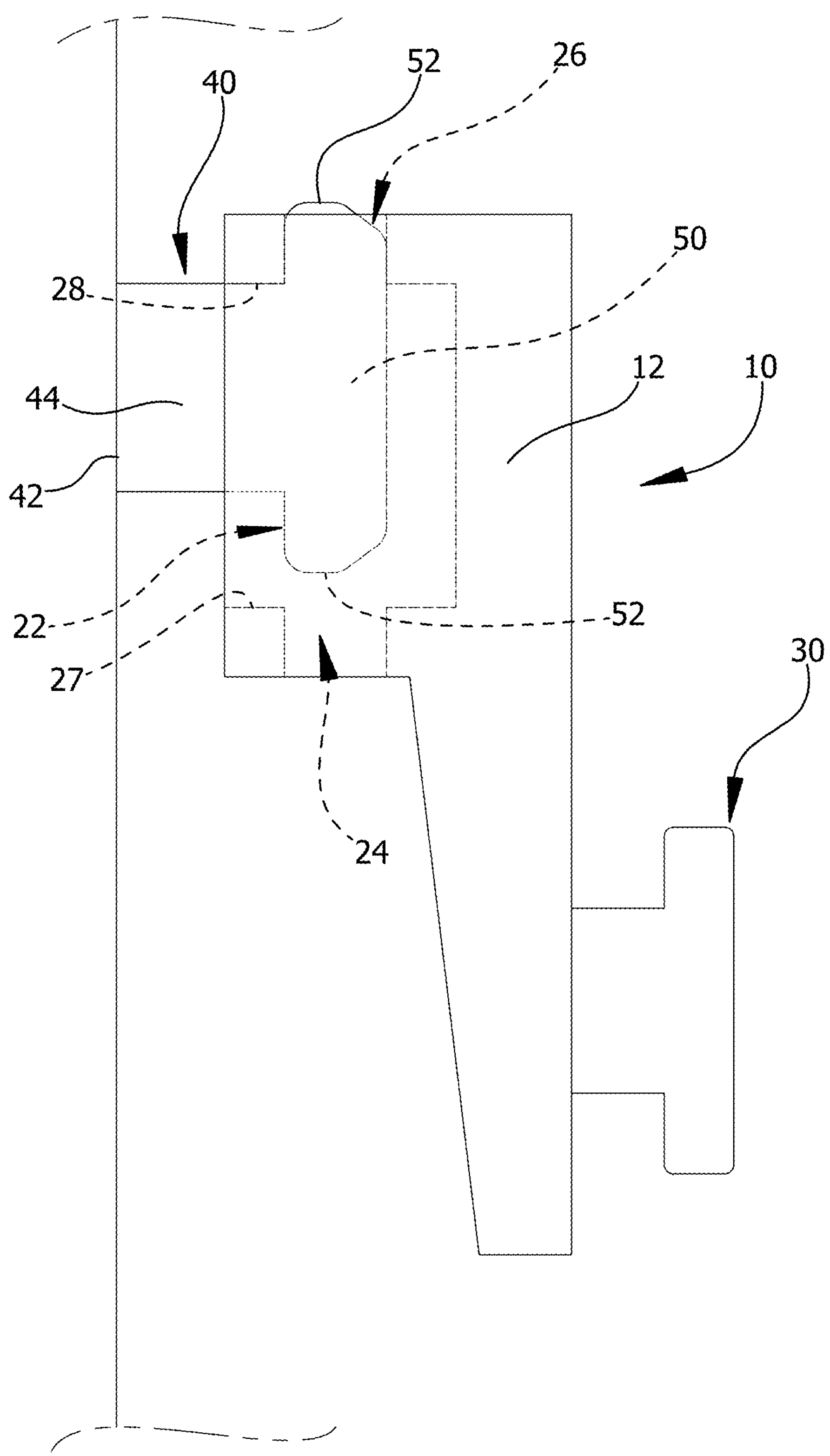
FIG. 7 is an in-use view of an embodiment of the disclosure in an inverted configuration.

For example, as shown in FIG. 5, the bracket adapter apparatus 10 is angled to receive the lower end 54 of the front portion 50 into the slot 22 and into the lower channel 26, which provides enough clearance for a remainder of the front portion 50 to enter the slot 22. Then the main body 12 may be allowed to come to rest on the uppermost side 46 of the rear portion 44 of the projection 42 while receiving the upper end 52 of the front portion 50 into the upper channel 24, as seen in FIG. 6. A similar process may be followed to hang the bracket adapter apparatus 10 in an inverted configuration. In other embodiments, the slot 22 may have a greater height such that the angling described is not necessary.

When the bracket adapter apparatus 10 is hung on the uppermost side 46 of the rear portion 44 of the projection 42, the back side 20 of the main body 12 may lie against a base portion of the mounting bracket 40. The bracket adapter apparatus 10 may also be used on other mounting brackets of varying shapes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A bracket adapter apparatus comprising:

a main body defining a slot in a back side thereof, the slot being sized and configured to receive a projection of a mounting bracket therein;

an offset projection coupled to the main body, the offset projection extending forwardly with respect to the main body, the offset projection including a rear section and a front section, the front section extending upwardly beyond an upper side of the rear section, the upper side of the rear section of the offset projection being offset in a vertical direction from an upper inner surface of the slot, the vertical direction being defined as extending between a top side and a bottom side of the main body; and wherein the main body defines an upper channel which is in fluid communication with the slot, the upper channel extending toward the top side of the main body.

2. The bracket adapter apparatus of claim 1, wherein the upper channel is open at the top side of the main body.

3. The bracket adapter apparatus of claim 1, wherein the main body defines a lower channel which is in fluid communication with the slot, the lower channel extending toward the bottom side of the main body.

4. The bracket adapter apparatus of claim 3, wherein the lower channel is open at the bottom side of the main body.

5. The bracket adapter apparatus of claim 3, wherein a height of the slot between an upper inner surface of the slot and a lower inner surface of the slot is configured to be less than a height of a front portion of the projection between an upper end of the front portion and a lower end of the front portion, the height of the slot being configured to be greater than a height of a rear portion of the projection between an uppermost side of the rear portion and a lowermost side of the rear portion.

6. The bracket adapter apparatus of claim 5, wherein the front section extends downwardly beyond a lower side of the rear section.

7. The bracket adapter apparatus of claim 6, wherein the upper side of the rear section is offset upwardly from the uppermost side of the rear portion of the projection, the lower side of the rear section being offset upwardly from the lowermost side of the rear portion of the projection.

8. The bracket adapter apparatus of claim 1, further comprising an extension member coupled to the main body, the extension member coupling the offset projection to the main body.

9. The bracket adapter apparatus of claim 8, wherein the extension member is positioned on the top side of the main body, the extension member being positioned between the upper channel and a front side of the main body, the extension member extending upwardly from the main body with respect to the main body.

10. A bracket adapter apparatus comprising:

a main body defining a slot in a back side thereof, the slot being sized and configured to receive a projection of a mounting bracket therein, the main body defining an upper channel which is in fluid communication with the slot, the upper channel extending toward a top side of the main body, the main body defining a lower channel which is in fluid communication with the slot, the lower channel extending toward a bottom side of the main body, the upper channel being open at the top side of the main body, the lower channel being open at the bottom side of the main body, a height of the slot between an upper inner surface of the slot and a lower inner surface of the slot being configured to be less than a height of a front portion of the projection between an upper end of the front portion and a lower end of the front portion, the height of the slot being configured to be greater than a height of a rear portion of the projection between an uppermost side of the rear portion and a lowermost side of the rear portion;

an extension member coupled to the main body, the extension member being positioned on the top side of the main body, the extension member being positioned between the upper channel and a front side of the main body, the extension member extending upwardly from the main body with respect to the main body; and an offset projection coupled to a front surface of the extension member, the offset projection including a rear section and a front section, the front section extending upwardly beyond an upper side of the rear section, the front section extending downwardly beyond a lower side of the rear section, the upper side of the rear section being offset upwardly from the uppermost side of the rear portion of the projection, the lower side of the rear section being offset upwardly from the lowermost side of the rear portion of the projection.

* * * * *